United States Patent [19]

Shenoi et al.

[11] Patent Number: 5,007,086

[45] Date of Patent: Apr. 9, 1991

[54] APPARATUS AND METHOD FOR GENERATING LOW LEVEL NOISE SIGNALS

[75] Inventors: Kishan Shenoi, Milpitas; Helena S. Ho, San Jose, both of Calif.

[73] Assignee: DSC Communications Corporation, Plano, Tex.

[21] Appl. No.: 552,767

[22] Filed: Jul. 16, 1990

[51] Int. Cl.$^5$ .............................................. H04L 9/00
[52] U.S. Cl. .................................. 380/46; 364/224.21; 364/717
[58] Field of Search .................... 364/224.21, 717; 380/46; 331/78; 379/410

[56] References Cited

U.S. PATENT DOCUMENTS 4,545,024  10/1985  Maher .................................. 364/717

OTHER PUBLICATIONS

Brown, A.D.E.; "Generate Gaussian Noise with a DSP Chip", *EDN Magazine*, Jun. 23, 1988.

*Primary Examiner*—Thomas H. Tarcza
*Assistant Examiner*—David Cain
*Attorney, Agent, or Firm*—Baker & Botts

[57] ABSTRACT

A method and apparatus for generating low level noise signals are provided. Two random numbers $X_1$ and $Y_1$ are first generated and bits 0-4 of the first random number $X_1$ are extracted to produce a number $X_2$. A number $X_3$ is further computed by the formula: $X_3 = 2^{-N}(X_2 \cdot I)$, where N is a predetermined number and $1 \leq I \geq 2^N - 1$. Bit 7 of the second random number $Y_1$ is then extracted and combined as a sign bit with the computed number $X_3$ to produce a sign-magnitude eight bit number W representing a sample of low level noise encoded in accordance with $\mu$-law.

45 Claims, 1 Drawing Sheet

APPARATUS AND METHOD FOR GENERATING LOW LEVEL NOISE SIGNALS

TECHNICAL FIELD OF THE INVENTION

This invention relates in general to the field of telecommunications. More particularly, the present invention relates to apparatus and a method for generating low level noise signals.

BACKGROUND OF THE INVENTION

In the field of telecommunications, several applications demand the generation of noise in the −70 to −40 dBm0 range. For example, when low level echos on a telephone line are suppressed by a residual suppressor or the like, the line sounds "dead" to the users, who are led believe that the connection has been cut off. Studies have shown that when noise having a power level approximately equal to the background noise level on the near end is injected onto the line, the anxiety of the telephone users is relieved.

In speech compression systems that employ digital speech interpolation techniques, the half-duplex characteristic of voice communication is utilized, so that during periods of silence on a given channel, bandwidth is deallocated. Predictably, the telephone connection associated with the channel will sound disconnected to the users unless low level noise is injected at the far end.

Because most digitized signals in telephony must adhere to a µ-law encoding scheme, conventional noise generation schemes must first generate the noise sample via digital signal processing (DSP) techniques and then convert it to an 8-bit pseudo-logarithmic sign-magnitude µ-law representation. Details on the definition of µ-law may be acquired by consulting Bell Publication 43801.

One traditional method of µ-law conversion directly computes from the linear sample generated by DSP. Another method uses an 8K × 8 look-up table that yields the µ-law numeric representation given a linear sample generated by DSP. Both methods require a two step process: 1) compute noise sample in DSP, and 2) convert to µ-law representation. Additionally, the first method requires additional hardware and computation power and the second method requires fast memory storage space.

It is therefore desirable to provide for a method and apparatus which generates low level noise in accordance with the µ-law encoding scheme without requiring additional processing hardware, time and memory.

SUMMARY OF THE INVENTION

In accordance with the present invention, apparatus and a method for generating low level noise signals are provided which substantially eliminate or reduce disadvantages and problems associated with prior circuits.

In one aspect of the present invention, a method for generating low level noise signals is provided. Two random numbers $X_1$ and $Y_1$ are first generated and bits 0-4 of the first random number $X_1$ are extracted to produce a number $X_2$. A number $X_3$ is further computed by the formula $X_3 = 2^{-N}(X_2 \times I)$, where N is a predetermined number and $1 \leq I \leq 2^N - 1$. Bit 7 of the second random number $Y_1$ is then extracted and combined as a sign bit with the computed number $X_3$ to produce a sign-magnitude eight-bit number W representing a sample of low level noise encoded in accordance with µ-law.

In yet another aspect of the present invention, apparatus for generating low level noise signals is provided which comprises means for generating a random number and for extracting the n least significant bits of the random number. Additionally, means is further provided for multiplying the extracted n bits by a first predetermined number I and producing a product, and for right shifting the bits of the product by a second predetermined number N places. A random sign bit is generated and combined with the right shifted bits to produce a noise sample that is in accordance with µ-law.

An important technical advantage of the present invention provides for a method and apparatus for generating low level noise signals in accordance with µ-law without the additional hardware, computational power and time required by conventional means.

BRIEF DESCRIPTION OF THE DRAWINGS

For a better understanding of the present invention, reference may be made to the accompanying drawings, in which.

DETAILED DESCRIPTION OF THE INVENTION

Figure 1:
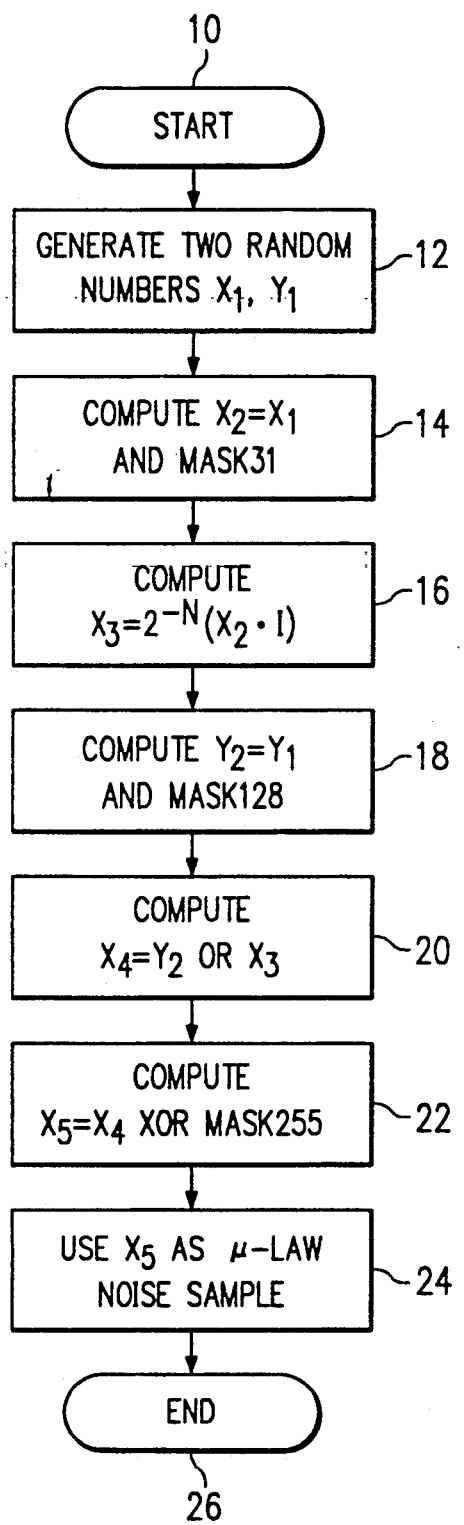
FIG. 1 is a flowchart of the method according to the teachings of the present invention.

With reference to the drawings, FIG. 1 is a flowchart of the method for generating low level noise signals according to the teaching of the present invention. In the preferred embodiment, the algorithm shown in FIG. 1 may be implemented in firmware in a DSP processor.

The method begins in block 10 and generates two random numbers $X_1$ and $Y_1$ with uniform probability distribution function in block 12. Such random number generation algorithms are well known in the art and will not be discussed in detail herein.

Proceeding to block 14, $X_1$ is bit-wise ANDed with a predetermined bit mask MASK31 to derive $X_2$. Assume DSP processor word length is greater than 8 bits or, for conventional processors, 16 bits, then

MASK31 = 0000000000011111, 001F in hexadecimal (001F$_{16}$) or 31 in decimal. In effect, MASK31 masks out all upper 11 bits of $X_1$ and retains only the five least significant bits.

In block 16, $X_3$ is computed by using the following formula:

$$X_3 = 2^{-N}(X_2 \times I),$$

where N is a predetermined number and $1 \leq I \leq 2^N - 1$. In other words, I may be an N-bit unsigned number. In the preferred embodiment of the present invention, the value of I determines the resultant noise power level and N affects the granularity of noise power levels. Typically, $4 \leq N \leq 7$, where the greater the value of N, the closer the approximation of the resultant noise level to the desired level. However, with N > 7, there is diminishing return on the approximation. Tables 1–4 below list values for I and corresponding power levels for N = 4, 5, 6 and 7.

TABLE 1

| | N = 4 | | |
|---|---|---|---|
| I | Power (dBmO) | I | Power (dBmO) |
| 1 | −68.7 | 2 | −60.6 |
| 3 | −56.6 | 4 | −53.6 |
| 5 | −51.7 | 6 | −50.0 |
| 7 | −48.6 | 8 | −47.2 |
| 9 | −46.4 | 10 | −45.1 |
| 11 | −43.9 | 12 | −42.8 |
| 13 | −41.7 | 14 | −40.5 |

TABLE 2

| | N = 5 | | |
|---|---|---|---|
| I | Power (dBmO) | I | Power (dBmO) |
| 1 | −96.8 | 2 | −68.8 |
| 3 | −63.9 | 4 | −60.6 |
| 5 | −58.4 | 6 | −56.5 |
| 7 | −55.1 | 8 | −53.6 |
| 9 | −52.7 | 10 | −51.7 |
| 11 | −50.8 | 12 | −50.0 |
| 13 | −49.4 | 14 | −48.6 |
| 15 | −48.1 | 16 | −47.2 |
| 17 | −46.9 | 18 | −46.4 |
| 19 | −45.7 | 20 | −45.1 |
| 21 | −44.4 | 22 | −43.9 |
| 23 | −43.2 | 24 | −42.6 |
| 25 | −42.2 | 26 | −41.8 |
| 27 | −41.2 | 28 | −40.7 |
| 29 | −40.1 | 30 | −39.8 |

TABLE 3

| | N = 6 | | |
|---|---|---|---|
| I | Power (dBmO) | I | Power (dBmO) |
| 1 | −96.8 | 2 | −96.8 |
| 3 | −70.7 | 4 | −68.7 |
| 5 | −65.2 | 6 | −63.9 |
| 7 | −62.0 | 8 | −60.6 |
| 9 | −59.5 | 10 | −58.4 |
| 11 | −57.5 | 12 | −56.5 |
| 13 | −55.8 | 14 | −55.1 |
| 15 | −54.4 | 16 | −53.3 |
| 17 | −53.3 | 18 | −52.7 |
| 19 | −52.2 | 20 | −51.7 |
| 21 | −51.2 | 22 | −51.0 |
| 23 | −50.4 | 24 | −50.0 |
| 25 | −49.7 | 26 | −49.4 |
| 27 | −48.9 | 28 | −48.6 |
| 29 | −48.2 | 30 | −48.0 |
| 31 | −47.7 | 32 | −47.2 |
| 33 | −47.3 | 34 | −46.9 |
| 35 | −46.6 | 36 | −46.3 |
| 37 | −46.1 | 38 | −45.7 |
| 39 | −45.4 | 40 | −45.1 |
| 41 | −44.9 | 42 | −44.5 |
| 43 | −44.1 | 44 | −44.0 |
| 45 | −43.6 | 46 | −43.4 |
| 47 | −43.0 | 48 | −42.7 |
| 49 | −42.5 | 50 | −42.3 |
| 51 | −41.9 | 52 | −41.6 |
| 53 | −41.3 | 54 | −41.2 |
| 55 | −40.9 | 56 | −40.7 |
| 57 | −40.5 | 58 | −40.2 |
| 59 | −40.1 | 60 | −39.7 |
| 61 | −39.6 | 62 | −39.2 |

TABLE 4

| | N = 7 | | |
|---|---|---|---|
| I | Power (dBmO) | I | Power (dBmO) |
| 1 | −96.8 | 2 | −96.8 |
| 3 | −96.8 | 4 | −96.8 |
| 5 | −73.1 | 6 | −70.7 |
| 7 | −69.5 | 8 | −68.8 |
| 9 | −66.9 | 10 | −65.3 |
| 11 | −64.5 | 12 | −63.9 |
| 13 | −62.8 | 14 | −61.9 |
| 15 | −61.3 | 16 | −60.6 |
| 17 | −60.1 | 18 | −59.5 |
| 19 | −58.8 | 20 | −58.5 |
| 21 | −58.0 | 22 | −57.5 |
| 23 | −56.9 | 24 | −56.6 |
| 25 | −56.2 | 26 | −55.7 |
| 27 | −55.4 | 28 | −55.1 |
| 29 | −54.9 | 30 | −54.4 |
| 31 | −54.0 | 32 | −53.6 |
| 33 | −53.7 | 34 | −53.3 |
| 35 | −52.9 | 36 | −52.7 |
| 37 | −52.4 | 38 | −52.1 |
| 39 | −51.9 | 40 | −51.7 |
| 41 | −51.4 | 42 | −51.3 |
| 43 | −51.0 | 44 | −50.9 |
| 45 | −50.7 | 46 | −50.5 |
| 47 | −50.3 | 48 | −49.9 |
| 49 | −49.9 | 50 | −49.5 |
| 51 | −49.6 | 52 | −49.3 |
| 53 | −49.1 | 54 | −49.0 |
| 55 | −48.7 | 56 | −48.5 |
| 57 | −48.4 | 58 | −48.3 |
| 59 | −48.1 | 60 | −48.0 |
| 61 | −47.8 | 62 | −47.6 |
| 63 | −47.6 | 64 | −47.3 |
| 65 | −47.2 | 66 | −47.2 |
| 67 | −47.0 | 68 | −46.8 |
| 69 | −46.8 | 70 | −46.6 |
| 71 | −46.4 | 72 | −46.3 |
| 73 | −46.2 | 74 | −46.1 |
| 75 | −45.9 | 76 | −45.8 |
| 77 | −45.5 | 78 | −45.4 |
| 79 | −45.3 | 80 | −45.1 |
| 81 | −45.0 | 82 | −44.9 |
| 83 | −44.7 | 84 | −44.4 |
| 85 | −44.4 | 86 | −44.1 |
| 87 | 44.0 | 88 | −43.9 |
| 89 | −43.7 | 90 | −43.6 |
| 91 | −43.5 | 92 | −43.3 |
| 93 | −43.2 | 94 | −43.0 |
| 95 | −42.8 | 96 | −42.7 |
| 97 | −42.7 | 98 | −42.6 |
| 99 | −42.4 | 100 | −42.2 |
| 101 | −42.2 | 102 | −42.0 |
| 103 | −41.8 | 104 | −41.7 |
| 105 | −41.5 | 106 | −41.4 |
| 107 | −41.3 | 108 | −41.2 |
| 109 | −41.1 | 110 | −40.9 |
| 111 | −40.8 | 112 | −40.6 |
| 113 | −40.7 | 114 | −40.5 |
| 115 | −40.5 | 116 | −40.3 |
| 117 | −40.1 | 118 | −40.0 |
| 119 | −39.8 | 120 | −39.7 |
| 121 | −39.7 | 122 | −39.7 |
| 123 | −39.5 | 124 | −39.2 |
| 125 | −39.2 | 126 | −39.2 |

As a result, $X_3$ is a value between 0 and 31 may be represented in 16 bits in binary as:

$X_3$ = 00000000000XXXXX, where x may be 1's or 0's with equal probability. In block 18, a $Y_2$ is computed by performing ($Y_1$ AND MASK128), where

MASK128 = 0000000010000000, $00080_{16}$ or 128 in decimal. Therefore, $Y_2$ will be of the form $Y_2$ = 00000000X0000000, where X may be 0 or 1 with equal probability.

Thereafter in block 20, $X_4$ is computed by bit-wise ORing $Y_2$ and $X_3$. By examining the last two steps it may be seen that the eight least significant bits of result $X_4$ will have a magnitude equal to $X_3$ and has an equal probability of being a positive or a negative number arising from the value of $Y_2$. Thus, $X_4$ is the 8-bit $\mu$-law representation of a noise sample. Referring to block 22, the complement of the eight least significant bits of $X_4$ is obtained by a bit-wise XOR (exclusive-OR) operation of $X_4$ and a MASK255, where MASK255 = 0000000011111111, 00FF$_{16}$ or 255 in decimal. This last step is performed in order to produce an eight bit representation in conformance with conventions in the industry, where complements of each bit are transmitted to satisfy the low active nature of the $\mu$-law encoding scheme.

From the foregoing it may be seen that the present invention may be utilized to generate low level noise when the precise power level of the noise generated is not required. In general, the present invention satisfies those applications where the accuracy of the power level is ±1dB.

It is also apparent from the foregoing that the present invention, which involves logic and arithmetic operations, may be implemented in software, hardware or a combination thereof to achieve substantially the same result. In addition, although the word length described herein is 16 bits, the application of the present invention to systems having word lengths other than 16, but greater than 8, is trivial.

Although the present invention has been described in detail, it should be understood that various changes, substitutions and alterations can be made hereto without departing from the spirit and scope of the present invention as defined by the appended claims.

What is claimed is:

1. A method for generating low level noise samples, comprising the steps of:
   producing a first random number having a first predetermined number of bits;
   masking out a second predetermined number of most significant bits of said random number and producing a second random number;
   adjusting said second random number to achieve a desired power level;
   adjusting said adjusted random number to achieve a desired power level granularity; and
   randomly generating a sign bit, combining with said adjusted random number and producing a noise sample.

2. The method, as set forth in claim 1, further comprising the step of inverting the bit values of said produced noise sample.

3. The method, as set forth in claim 1, wherein said masking step comprises bit-wise ANDing said random number with a predetermined bit mask.

4. The method, as set forth in claim 3, wherein said bit-wise ANDing step performs the AND operation on said random number and said predetermined bit mask, said mask having 1's in the five least significant bits and 0's elsewhere.

5. The method, as set forth in claim 1, wherein said power level adjusting step comprises multiplying said second random number with a third predetermined number I.

6. The method, as set forth in claim 5, wherein said power level granularity adjusting step comprises right shifting said power level-adjusted second random number by a predetermined number of places N.

7. The method, as set forth in claim 6, wherein said power level and granularity adjusting steps includes adjusting said second random number with I and N, where $1 \leq I \leq 2^N - 1$.

8. The method, as set forth in claim 6, wherein said right shifting step shifts said adjusted second random number by N, where $4 \leq N \leq 7$.

9. The method, as set forth in claim 1, wherein said power level granularity adjusting step comprises right shifting said power level-adjusted second random number by a predetermined number of places.

10. The method, as set forth in claim 1, wherein said sign bit generating step comprises the steps of:
    generating a random number; and
    bit-wise ANDing said random number with a predetermined bit mask, said mask having a 1 at a predetermined sign bit position and 0's elsewhere.

11. The method, as set forth in claim 10, wherein said random number generating step generates said random number with a uniform probability distribution function.

12. The method, as set forth in claim 1, wherein said first random number producing step produces said first random number with a uniform probability distribution function.

13. The method, as set forth in claim 1, wherein said noise sample generated is in accordance with the $\mu$-law encoding scheme.

14. A method for generating low level noise signals, comprising the steps of:
    generating a random number represented by m number of bits;
    extracting the n least significant bits of said random number, where $m > n$;
    multiplying said extracted n bits by a first predetermined number I and producing a product;
    right shifting the bits of said product by a second predetermined number N places; and
    randomly generating a sign bit, combining with said right shifted bits and producing a noise sample.

15. The method, as set forth in claim 14, further comprising the step of inverting the bits of said noise sample.

16. The method, as set forth in claim 14, wherein said multiplying step multiplies said first extracted n bits by said predetermined number I, where I is greater than and equal to 1 and less than and equal to $2^N - 1$.

17. The method, as set forth in claim 14, wherein said generating step generates said random number with a uniform probability distribution function.

18. The method, as set forth in claim 14, wherein said random sign bit has a uniform probability distribution function.

19. The method, as set forth in claim 14, wherein said extracting step comprises the step of bit-wise ANDing said random number with a predetermined mask, where the five least significant bits are 1's and 0's elsewhere.

20. The method, as set forth in claim 14, wherein said random number generating step generates said random number representable in m bits, where m is greater than eight.

21. The method, as set forth in claim 14, wherein said right shifting step shifts said product by N, where N is greater than or equal to 4 and less than or equal to 7.

22. The method, as set forth in claim 14, wherein said noise sample generated is in accordance with the $\mu$-law encoding scheme.

23. A method for generating low level noise signals, comprising the steps of:
    generating a first and second random number $X_1$ and $Y_1$, each said random number represented in bits 0-n, where bit 0 is the least significant bit and n is greater than 7;

extracting bits 0-4 of said first random number $X_1$ and producing a number $X_2$;

computing a number $X_3$ by the following formula:

$$X_3 = 2^{-N}(X_2 \cdot I),$$

where N is a predetermined number and $1 \leq I \leq 2^N - 1$;

extracting bit 7 of said second random number $Y_1$; and combining said extracted bit 7 as a sign bit with said computed number $X_3$ and producing a sign-magnitude eight bit number W representing a sample of low level noise.

24. The method, as set forth in claim 23, comprising additionally the step of inverting every bit of noise sample W.

25. The method, as set forth in claim 23, wherein said first and second random number generating step generates $X_1$ and $Y_1$ with uniform probability distribution functions.

26. The method, as set forth in claim 23, wherein said first extracting step comprises the step of bit-wise ANDing said first random number $X_1$ with a predetermined mask, where bits 0-4 thereof are 1's and 0's elsewhere.

27. The method, as set forth in claim 23, where said second extracting step comprises the step of bit-wise ANDing said second random number $Y_1$ with a predetermined mask, where bit 7 thereof is a 1 and 0's elsewhere.

28. The method, as set forth in claim 23, wherein said combining step comprises the step of bit-wise ORing said extracted sign bit with said number $X_3$.

29. The method, as set forth in claim 23, wherein said noise sample generated is in accordance with the $\mu$-law encoding scheme.

30. Apparatus for generating low level noise signals, comprising:

means for generating a random number represented by m number of bits;

means for extracting the n least significant bits of said random number, where $m > n$;

means for multiplying said extracted n bits by a first predetermined number I and producing a product;

means for right shifting the bits of said product by a second predetermined number N places; and means for randomly generating a sign bit, combining with said right shifted bits and producing a noise sample.

31. The apparatus, as set forth in claim 30, further comprising means for inverting the bits of said noise sample.

32. The apparatus, as set forth in claim 30, wherein said first predetermined number I is greater than and equal to 1 and less than and equal to $2^N - 1$.

33. The apparatus, as set forth in claim 30, wherein said random number has a uniform probability distribution function.

34. The apparatus, as set forth in claim 30, wherein said random sign bit has a uniform probability distribution function.

35. The apparatus, as set forth in claim 30, wherein said extracting means further comprises means for bit-wise ANDing said random number with a predetermined mask, where the five least significant bits are 1's and 0's elsewhere.

36. The apparatus, as set forth in claim 30, wherein the number of bits m of said random number is greater than eight.

37. The apparatus, as set forth in claim 30, wherein N is greater than and equal to 4 and less than and equal to 7.

38. The apparatus, as set forth in claim 30, wherein said noise sample generated is in accordance with the $\mu$-law encoding scheme.

39. A apparatus for generating low level noise signals, comprising:

means for generating a first and second random number $X_1$ and $Y_1$, each said random number represented in bits 0-n, where bit 0 is the least significant bit and n is greater than 7;

means for extracting bits 0-4 of said first random number $X_1$ and producing a number $X_2$;

means for computing a number $X_3$ by the following formula:

$X_3 = 2^{-N}(X_2 \cdot I)$, where N is a predetermined number and $1 \leq I \leq 2^N - 1$;

means for extracting bit 7 of said second random number $Y_1$; and means for combining said extracted bit 7 as a sign bit with said computed number $X_3$ and producing a sign-magnitude eight bit number W representing a sample of low level noise.

40. The apparatus, as set forth in claim 39, comprising additionally means for inverting every bit of noise sample W.

41. The apparatus, as set forth in claim 39, wherein said first and second random number generating step generates $X_1$ and $Y_1$ with uniform probability distribution functions.

42. The apparatus, as set forth in claim 39, wherein said first extracting means comprises means for bit-wise ANDing said first random number $X_1$ with a predetermined mask, where bits 0-4 thereof are 1's and 0's elsewhere.

43. The apparatus, as set forth in claim 39, where said second extracting means comprises means for bit-wise ANDing said second random number $Y_1$ with a predetermined mask, where bit 7 thereof is a 1 and 0's elsewhere.

44. The apparatus, as set forth in claim 39, wherein said combining means comprises means for bit-wise ORing said extracted sign bit with said number $X_3$.

45. The apparatus, as set forth in claim 39, wherein said noise sample generated is in accordance with the $\mu$-law encoding scheme.

* * * * *

UNITED STATES PATENT AND TRADEMARK OFFICE
CERTIFICATE OF CORRECTION

PATENT NO. : 5,007,086
DATED : April 9, 1991
INVENTOR(S) : Kishan Shenoi and Helena S. Ho It is certified that error appears in the above-identified patent and that said Letters Patent is hereby corrected as shown below:

Table 3, Column 3, line 39, change "-53.3" to ---53.5---.

Signed and Sealed this

Seventeenth Day of November, 1992

Attest:

DOUGLAS B. COMER

*Attesting Officer*      *Acting Commissioner of Patents and Trademarks*